(12) United States Patent
Katz et al.

(10) Patent No.: US 9,274,608 B2
(45) Date of Patent: Mar. 1, 2016

(54) SYSTEMS AND METHODS FOR TRIGGERING ACTIONS BASED ON TOUCH-FREE GESTURE DETECTION

(71) Applicants: Itay Katz, Tel Aviv (IL); Ofer Affias, Kiryat Ono (IL)

(72) Inventors: Itay Katz, Tel Aviv (IL); Ofer Affias, Kiryat Ono (IL)

(73) Assignee: EYESIGHT MOBILE TECHNOLOGIES LTD., Herzilya (IL)

( * ) Notice: Subject to any disclaimer, the term of this patent is extended or adjusted under 35 U.S.C. 154(b) by 0 days.

(21) Appl. No.: 14/078,636

(22) Filed: Nov. 13, 2013

(65) Prior Publication Data

US 2014/0168062 A1    Jun. 19, 2014

Related U.S. Application Data

(60) Provisional application No. 61/725,559, filed on Dec. 13, 2012.

(51) Int. Cl.
*G06F 3/01* (2006.01)

(52) U.S. Cl.
CPC ........................................ *G06F 3/017* (2013.01)

(58) Field of Classification Search
CPC .......................... G06F 3/017; G06F 2203/04101
USPC ................................... 354/156, 157; 715/863
See application file for complete search history.

(56) References Cited

U.S. PATENT DOCUMENTS

| | | | | |
|---|---|---|---|---|
| 8,971,565 B2 * | 3/2015 | Anzola | ................... | G06F 3/011 345/156 |
| 9,015,638 B2 * | 4/2015 | Kipman | ................. | A63F 13/06 345/156 |
| 2011/0119640 A1 * | 5/2011 | Berkes et al. | ................. | 715/863 |
| 2011/0209099 A1 * | 8/2011 | Hinckley et al. | .............. | 715/863 |
| 2011/0296357 A1 * | 12/2011 | Kim | ....................... | G06F 3/017 715/863 |
| 2012/0093360 A1 * | 4/2012 | Subramanian et al. | ....... | 382/103 |
| 2012/0154303 A1 * | 6/2012 | Lazaridis et al. | ............. | 345/173 |
| 2012/0162409 A1 * | 6/2012 | Setiawan et al. | ............. | 348/135 |
| 2013/0035941 A1 * | 2/2013 | Kim et al. | ..................... | 704/275 |
| 2013/0088428 A1 * | 4/2013 | Ting et al. | ..................... | 345/157 |
| 2013/0120254 A1 * | 5/2013 | Mun et al. | ..................... | 345/158 |
| 2013/0162513 A1 * | 6/2013 | Ronkainen | .................... | 345/156 |
| 2013/0263036 A1 * | 10/2013 | Berenson et al. | ............ | 715/773 |
| 2013/0343607 A1 * | 12/2013 | Wilf et al. | .................... | 382/103 |

FOREIGN PATENT DOCUMENTS

WO    WO 2012159254 A1 * 11/2012

* cited by examiner

*Primary Examiner* — Tom Sheng

(74) *Attorney, Agent, or Firm* — Finnegan, Henderson, Farabow, Garrett & Dunner LLP

(57) ABSTRACT

Systems, methods and non-transitory computer-readable media for triggering actions based on touch-free gesture detection are disclosed. The disclosed systems may include at least one processor. A processor may be configured to receive image information from an image sensor, detect in the image information a gesture performed by a user, detect a location of the gesture in the image information, access information associated with at least one control boundary, the control boundary relating to a physical dimension of a device in a field of view of the user, or a physical dimension of a body of the user as perceived by the image sensor, and cause an action associated with the detected gesture, the detected gesture location, and a relationship between the detected gesture location and the control boundary.

37 Claims, 6 Drawing Sheets

SYSTEMS AND METHODS FOR TRIGGERING ACTIONS BASED ON TOUCH-FREE GESTURE DETECTION

TECHNICAL

The present disclosure relates to the field of touch-free gesture detection and, more particularly, systems and computer-readable media for causing an action to occur based on a detected touch-free gesture using a control boundary.

BACKGROUND

Permitting a user to interact with a device or an application running on a device is useful in many different settings. For example, keyboards, mice, and joysticks are often included with electronic systems to enable a user to input data, manipulate data, and cause a processor of the system to cause a variety of other actions. Increasingly, however, touch-based input devices, such as keyboards, mice, and joysticks, are being replaced by, or supplemented with, devices that permit touch-free user interaction. For example, a system may include an image sensor to capture images of a user, including, for example, a user's hands and/or fingers. A processor may be configured to receive such images and cause actions to occur based on touch-free gestures performed by the user.

It may be desirable to permit a user to make a number of different touch-free gestures that can be recognized by a system. However, the number of different types of touch-free gestures that can be detected and acted upon by a system is often limited. Improvements in techniques for detecting and acting upon touch-free gestures are desirable.

SUMMARY

In one disclosed embodiment, a touch-free gesture recognition system is described. The touch-free gesture recognition system may include at least one processor configured to receive image information from, an image sensor, detect in the image information a gesture performed by a user, detect a location of the gesture in the image information, access information associated with at least one control boundary, the control boundary relating to a physical dimension of a device in a field of view of the user, or a physical dimension of a body of the user as perceived by the image sensor and cause an action associated with the detected gesture, the detected gesture location, and a relationship between the detected gesture location and the control boundary.

In another disclosed embodiment, a non-transitory computer-readable medium is described. The non-transitory computer-readable medium may include instructions that, when executed by a processor, cause the processor to perform operations. The operations include receiving image information from an image sensor, detecting in the image information a gesture performed by a user, detecting a location of the gesture in the image information, accessing information associated with at least one control boundary, the control boundary relating to a physical dimension of a device in a field of view of the user, or a physical dimension of a body of the user as perceived by the image sensor, and causing an action associated with the detected gesture, the detected gesture location, and a relationship between the detected gesture location and the control boundary.

Additional aspects related to the embodiments will be set forth in part in the description which follows, and in part will be understood from the description, or may be learned by practice of the invention.

It is to be understood that both the foregoing general description and the following detailed description are exemplary and explanatory only and are not restrictive of the invention, as claimed.

DETAILED DESCRIPTION

Figure 1:
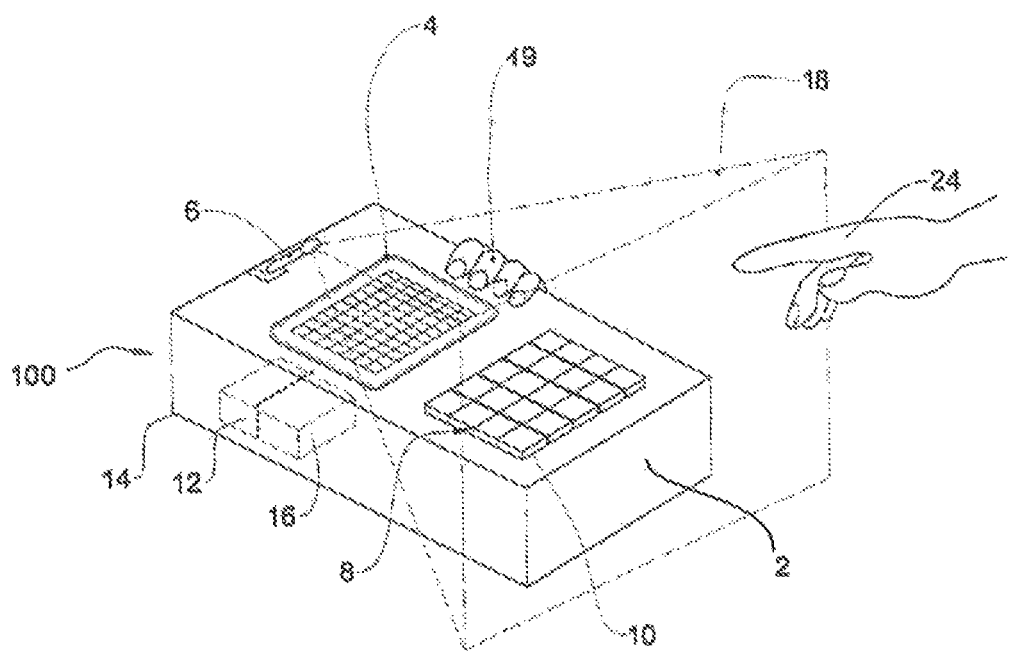
FIG. 1 illustrates an example touch-free gesture recognition system that may be used for implementing the disclosed embodiments.

Reference will now be made in detail to the example embodiments, which are illustrated in the accompanying drawings. Wherever possible, the same reference numbers will be used throughout the drawings to refer to the same or like parts.

A touch-free gesture recognition system is disclosed. A touch-free gesture recognition system may be any system in which, at least at some point during user interaction, the user is able to interact without physically contacting an interface such as, for example, a keyboard, mouse, or joystick. In some embodiments, the system includes at least one processor configured to receive image information from an image sensor. The processor may be configured to detect in the image information of a gesture performed by the user (e.g., a hand gesture) and to detect a location of the gesture in the image information. Moreover, in some embodiments, the processor is configured to access information associated with at least one control boundary, the control boundary relating to a physical dimension of a device in a field of view of the user, or a physical dimension of a body of the user as perceived by the image sensor. For example, and as described later in greater detail, a control boundary may be representative of an orthogonal projection of the physical edges of a device (e.g., a display) into 3D space or a projection of the physical edges of the device as is expected to be perceived by the user. Alternatively, or additionally, a control boundary may be representative of, for example, a boundary associated with the user's body (e.g., a contour of at least a portion of a user's body or a bounding shape such as a rectangular-shape surrounding a contour of a portion of the user's body). As described later in greater detail, a body of the user as perceived by the image sensor includes, for example, any portion of the image information captured by the image sensor that is associated with the visual appearance of the user's body.

In some embodiments, the processor is configured to cause an action associated with the detected gesture, the detected gesture location, and a relationship between the detected gesture location and the control boundary. The action performed by the processor may be, for example, generation of a message or execution of a command associated with the gesture. For example, the generated message or command may be addressed to any type of destination including, but not limited to, an operating system, one or more services, one or more applications, one or more devices, one or more remote applications, one or more remote services, or one or more remote devices.

For example, the action performed by the processor may comprise communicating with an external device or website responsive to selection of a graphical element. For example, the communication may include sending a message to an application running on the external device, a service running on the external device, an operating system running on the external device, a process running on the external device, one or more applications running on a processor of the external device, a software program running in the background of the external device, or to one or more services running on the external device. Moreover, for example, the action may include sending a message to an application running on a device, a service running on the device, an operating system running on the device, a process running on the device, one or more applications running on a processor of the device, a software program running in the background of the device, or to one or more services running on the device.

The action may also include, for example, responsive to a selection of a graphical element, sending a message requesting data relating to a graphical element identified in an image from an application running on the external device, a service running on the external device, an operating system running on the external device, a process running on the external device, one or more applications running on a processor of the external device, a software program running in the background of the external device, or to one or more services running on the external device. The action may also include, for example, responsive to a selection of a graphical element, sending a message requesting a data relating to a graphical element identified in an image from an application running on a device, a service running on the device, an operating system running on the device, a process running on the device, one or more applications running on a processor of the device, a software program running in the background of the device, or to one or more services running on the device.

The action may also include a command selected, for example, from a command to run an application on the external device or website, a command to stop an application running on the external device or website, a command to activate a service running on the external device or website, a command to stop a service running on the external device or website, or a command to send data relating to a graphical element identified in an image.

A message to a device may be a command. The command may be selected, for example, from a command to run an application on the device, a command to stop an application running on the device or website, a command to activate a service running on the device, a command to stop a service running on the device, or a command to send data relating to a graphical element identified in an image.

The action may also include, for example responsive to a selection of a graphical element, receiving from the external device or website data relating to a graphical element identified in an image and presenting the received data to a user. The communication with the external device or website may be over a communication network.

Gestures may be one-handed or two handed. Exemplary actions associated with a two-handed gesture can include, for example, selecting an area, zooming in or out of the selected area by moving the fingertips away from or towards each other, rotation of the selected area by a rotational movement of the fingertips. Actions associated with a two-finger pointing gesture can include creating an interaction between two objects, such as combining a music track with a video track or for a gaining interaction such as selecting an object by pointing with one finger, and setting the direction of its movement by pointing to a location on the display with another finger.

FIG. 1 is a diagram illustrating an example touch-free gesture recognition system 100 that may be used for implementing the disclosed embodiments. System 100 may include, among other things, one or more devices 2, illustrated generically in FIG. 1. Device 2 may be, for example, a personal computer (PC), an entertainment device, a set top box, a television, a mobile game machine, a mobile phone, a tablet computer, an e-reader, a portable game console, a portable computer such as a laptop or ultrabook, a home appliance such as a kitchen appliance, a communication device, an air conditioning thermostat, a docking station, a game machine such as a mobile video gaming device, a digital camera, a watch, an entertainment device, speakers, a Smart Home device, a media player or media system, a location-based device, a pico projector or an embedded projector, a medical device such as a medical display device, a vehicle, an in-car/in-air infotainment system, a navigation system, a wearable device, an augmented reality-enabled device, wearable goggles, a robot, interactive digital signage, a digital kiosk, a vending machine, an automated teller machine (ATM), or any other apparatus that may receive data from a user or output data to a user. Moreover, device 2 may be handheld (e.g., held by a user's hand 19) or non-handheld.

System 100 may include some or all of the following components: a display 4, image sensor 6, keypad 8 comprising one or more keys 10, processor 12, memory device 16, and housing 14. In some embodiments, some or all of the display 4, image sensor 6, keypad 8 comprising one or more keys 10, processor 12, housing 14, and memory device 16, are components of device 2. However, in some embodiments, some or all of the display 4, image sensor 6, keypad 8 comprising one or more keys 10, processor 12, housing 14, and memory device 16, are separate from, but connected to the device 2 (using either a wired or wireless connection). For example, image sensor 6 may be located apart from device 2. Moreover, in some embodiments, components such as, for example, the display 4, keypad 8 comprising one or more keys 10, or housing 14, are omitted from system 100.

A display 4 may include, for example, one or more of a television set, computer monitor, head-mounted display, broadcast reference monitor, a liquid crystal display (LCD) screen, a light-emitting diode (LED) based display, an LED-backlit LCD display, a cathode ray tube (CRT) display, an electroluminescent (ELD) display, an electronic paper/ink display, a plasma display panel, an organic light-emitting diode (OLED) display, thin-film transistor display (TFT), High-Performance Addressing display (HPA), a surface-conduction electron-emitter display, a quantum dot display, an interferometric modulator display, a swept-volume display, a carbon nanotube display, a variforcal mirror display, an emissive volume display, a laser display, a holographic display, a light field display, a projector and surface upon which images are projected, or any other electronic device for outputting visual information. In some embodiments, the display 4 is positioned in the touch-free gesture recognition system 100 such that the display 4 is viewable by one or more users.

Image sensor 6 may include, for example, a CCD image sensor, a CMOS image sensor, a camera, a light sensor, an IR sensor, an ultrasonic sensor, a proximity sensor, a shortwave infrared (SWIR) image sensor, a reflectivity sensor, or any other device that is capable of sensing visual characteristics of an environment. Moreover, image sensor 6 may include, for example, a single photosensor or 1-D line sensor capable of scanning an area, a 2-D sensor, or a stereoscopic sensor that includes, for example, a plurality of 2-D image sensors. Image sensor 6 may be associated with a lens for focusing a particular area of light onto the image sensor 6. In some embodiments, image sensor 6 is positioned to capture images of an area associated with at least some display-viewable locations. For example, image sensor 6 may be positioned to capture images of one or more users viewing the display 4. However, a display 4 is not necessarily a part of system 100, and image sensor 6 may be positioned at any location to capture images of a user and/or of device 2.

Image sensor 6 may view, for example, a conical or pyramidal volume of space 18, as indicated by the broken lines in FIG. 1. The image sensor 6 may have a fixed position on the device 2, in which case the viewing space 18 is fixed relative to the device 2, or may be positionably attached to the device 2 or elsewhere, in which case the viewing space 18 may be selectable. Images captured by the image sensor 6 may be digitized by the image sensor 6 and input to the processor 12, or may be input to the processor 12 in analog form and digitized by the processor 12.

Some embodiments may include at least one processor. The at least one processor may include any electric circuit that may be configured to perform a logic operation on at least one input variable, including, for example one or more integrated circuits, microchips, microcontrollers, and microprocessors, which may be all or part of a central processing unit (CPU), a digital signal processor (DSP), a field programmable gate array (FPGA), a graphical processing unit (GPU), or any other circuit known to those skilled in the art that may be suitable for executing instructions or performing logic operations. Multiple functions may be accomplished using a single processor or multiple related and/or unrelated functions may be divide among multiple processors.

In some embodiments, such is illustrated in FIG. 1, at least one processor may include processor 12 connected to memory 16. Memory 16 may include, for example, persistent memory, ROM, EEPROM, EAROM, flash memory devices, magnetic disks, magneto optical disks, CD-ROM, DVD-ROM, Blu-ray, and the like, and may contain instructions (i.e., software or firmware) or other data. Generally, processor 12 may receive instructions and data stored by memory 16. Thus, in some embodiments, processor 12 executes the software or firmware to perform functions by operating on input data and generating output. However, processor 12 may also be, for example, dedicated hardware or an application-specific integrated circuit (ASIC) that performs processes by operating on input data and generating output. Processor 12 may be any combination of dedicated hardware, one or more ASICs, one or more general purpose processors, one or more DSPs, one or more GPUs, or one or more other processors capable of processing digital information.

Figure 2:
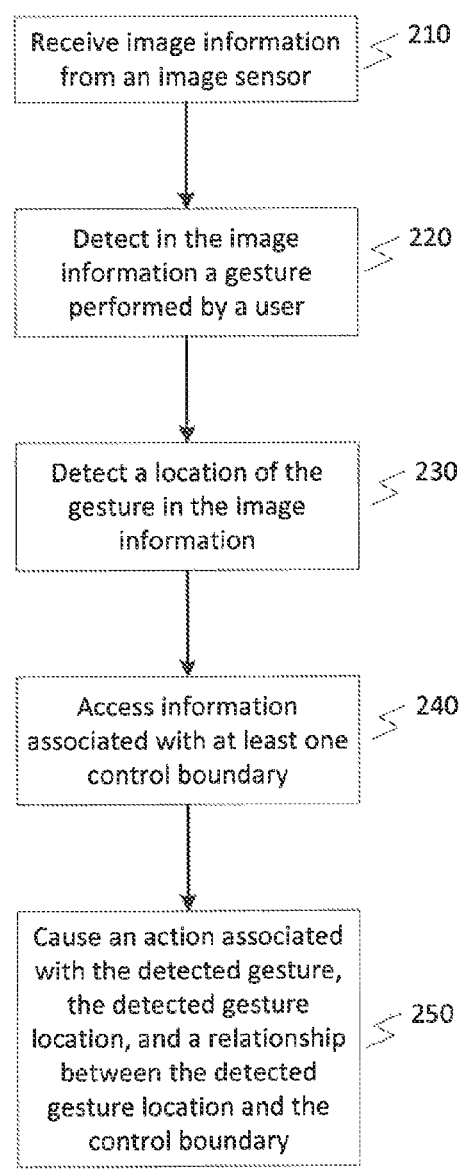
FIG. 2 illustrates example operations that a processor of a touch-free gesture recognition system may be configured to perform, in accordance with some of the disclosed embodiments.

FIG. 2 illustrates exemplary operations 200 that at least one processor may be configured to perform. For example, as discussed above, processor 12 of the touch-free gesture recognition system 100 may be configured to perform these operations by executing software or firmware stored in memory 16, or may be configured to perform these operations using dedicated hardware or one or more ASICs.

In some embodiments, at least one processor may be configured to receive image information from an image sensor (operation 210).

In order to reduce data transfer from the image sensor 6 to an embedded device motherboard, general purpose processor, application processor, GPU a processor controlled by the application processor, or any other processor, including, for example, processor 12, the gesture recognition system may be partially or completely be integrated into the image sensor 6. In the case where only partial integration to the image sensor, ISP or image sensor module takes place, image preprocessing, which extracts an object's features related to the predefined object, may be integrated as part of the image sensor, ISP or image sensor module. A mathematical representation of the video/image and/or the object's features may be transferred for further processing on an external CPU via dedicated wire connection or bus. In the case that the whole system is integrated into the image sensor, ISP or image sensor module, only a message or command (including, for example, the messages and commands discussed in more detail above and below) may be sent to an external CPU. Moreover, in some embodiments, if the system incorporates a stereoscopic image sensor, a depth map of the environment may be created by image preprocessing of the video/image in each one of the 2D image sensors or image sensor ISPs and the mathematical representation of the video/image, object's features, and/or other reduced information may be further processed in an external CPU.

"Image information," as used in this application, may be one or more of an analog image captured by image sensor 6, a digital image captured or determined by image sensor 6, subset of the digital or analog image captured by image sensor 6, digital information further processed by an ISP, a mathematical representation or transformation of information associated with data sensed by image sensor 6, frequencies in the image captured by image sensor 6, conceptual information such as presence of objects in the field of view of the image sensor 6, information indicative of the state of the image sensor or its parameters when capturing an image (e.g., exposure, frame rate, resolution of the image, color bit resolution, depth resolution, or field of view of the image sensor), information from other sensors when the image sensor 6 is capturing an image (e.g., proximity sensor information, or accelerometer information), information describing further processing that took place after an image was captured, illumination conditions when an image is captured, features extracted from a digital image by image sensor 6, or any other information associated with data sensed by image sensor 6. Moreover, "image information" may include information associated with static images, motion images (i.e., video), or any other visual-based data.

In some embodiments, the at least one processor may be configured to detect in the image information a gesture performed by a user (operation 220). Moreover, in some embodiments, the at least one processor may be configured to detect a location of the gesture in the image information (operation 230). The gesture may be, for example, a gesture performed by the user using predefined object 24 in the viewing space 16. The predefined object 24 may be, for example, one or more hands, one or more fingers, one or more fingertips, one or more other parts of a hand, or one or more hand-held objects associated with a user. In some embodiments, detection of the gesture is initiated based on detection of a hand at a predefined location or in a predefined pose. For example, detection of a gesture may be initiated if a hand is in a predefined pose and in a predefined location with respect to a control boundary. More particularly, for example, detection of a gesture may be initiated if a hand is in an open-handed pose (e.g., all fingers of the hand away from the palm of the hand) or in a first pose (e.g., all fingers of the hand folded over the palm of the hand). Detection of a gesture may also be initiated if, for example, a hand is detected in a predefined pose while the hand is outside of the control boundary (e.g., for a predefined amount of time), or a predefined gesture is performed in relation to the control boundary. Moreover, for example, detection of a gesture may be initiated based on the user location, as captured by image sensor 6 or other sensors. Moreover, for example, detection of a gesture may be initiated based on a detection of another gesture. E.g., to detect a "left to right" gesture, the processor may first detect a "waving" gesture.

As used in this application, the term "gesture" may refer to, for example, a swiping gesture associated with an object presented on a display, a pinching gesture of two fingers, a pointing gesture towards an object presented on a display, a left-to-right gesture, a right-to-left gesture, an upwards gesture, a downwards gesture, a pushing gesture, a waving gesture, a clapping gesture, a reverse clapping gesture, a gesture of splaying fingers on a hand, a reverse gesture of splaying fingers on a hand, a holding gesture associated with an object presented on a display for a predetermined amount of time, a clicking gesture associated with an object presented on a display, a double clicking gesture, a right clicking gesture, a left clicking gesture, a bottom clicking gesture, a top clicking gesture, a grasping gesture, a gesture towards an object presented on a display from a right side, a gesture towards an object presented on a display from a left side, a gesture passing through an object presented on a display, a blast gesture, a tipping gesture, a clockwise or counterclockwise two-finger grasping gesture over an object presented on a display, a click-drag-release gesture, a gesture sliding an icon such as a volume bar, or any other motion associated with a hand or handheld object. A gesture may be detected in the image information if the processor 12 determines that a particular gesture has been or is being performed by the user.

An object associated with the user may be detected in the image information based on, for example, the contour and/or location of an object in the image information. For example, processor 12 may access a filter mask associated with predefined object 24 and apply the filter mask to the image information to determine if the object is present in the image information. That is, for example, the location in the image information most correlated to the filter mask may be determined as the location of the object associated with predefined object 24. Processor 12 may be configured, for example, to detect a gesture based on a single location or based on a plurality of locations over time. Processor 12 may also be configured to access a plurality of different filter masks associated with a plurality of different hand poses. Thus, for example, a filter mask from the plurality of different filter masks that has a best correlation to the image information may cause a determination that the hand pose associated with the filter mask is the hand pose of the predefined object 24. Processor 12 may be configured, for example, to detect a gesture based on a single pose or based on a plurality of poses over time. Moreover, processor 12 may be configured, for example, to detect a gesture based on both the determined one or more locations and the determined one or more poses. Other techniques for detecting real-world objects in image information (e.g., edge matching, greyscale matching, gradient matching, and other image feature based methods) are well known in the art, and may also be used to detect a gesture in the image information. For example, U.S. Patent Application Publication No. 2012/0092304 and U.S. Patent Application Publication No. 2011/0291925 disclose techniques for performing object detection, both of which are incorporated by reference in their entirety. Each of the above-mentioned gestures may be associated with a control boundary.

A gesture location, as used herein, may refer to one or a plurality of locations associated with a gesture. For example, a gesture location may be a location of an object or gesture in the image information as captured by the image sensor, a location of an object or gesture in the image information in relation to one or more control boundaries, a location of an object or gesture in the 3D space in front of the user, a location of an object or gesture in relation to a device or physical dimension of a device, or a location of an object or gesture in relation to the user body or part of the user body such as the user's head. For example, a "gesture location" may include a set of locations comprising one or more of a starting location of a gesture, intermediate locations of a gesture, and an ending location of a gesture. A processor 12 may detect a location of the gesture in the image information by determining locations on display 4 associated with the gesture or locations in the image information captured by image sensor 6 that are associated with the gesture (e.g., locations in the image information in which the predefined object 24 appears while the gesture is performed). For example, as discussed above, processor 12 may be configured to apply a filter mask to the image information to detect an object associated with predefined object 24. In some embodiments, the location of the object associated with predefined object 24 in the image information may be used as the detected location of the gesture in the image information.

In other embodiments, the location of the object associated with predefined object 24 in the image information may be used to determine a corresponding location on display 4 (including, for example, a virtual location on display 4 that is outside the boundaries of display 4), and the corresponding location on display 4 may be used as the detected location of the gesture in the image information. For example, the gesture may be used to control movement of a cursor, and a gesture associated with a control boundary may be initiated when the cursor is brought to an edge or corner of the control boundary. Thus, for example, a user may extend a finger in front of the device, and the processor may recognize the fingertip, enabling the user to control a cursor. The user may then move the fingertip to the right, for example, until the cursor reaches the right edge of the display. When the cursor reaches the right edge of the display, a visual indication may be displayed indicating to the user that a gesture associated with the right edge is enabled. When the user then performs a gesture to the left, the gesture detected by the processor may be associated with the right edge of the device.

The following are examples of gestures associated with a control boundary:

"Hand-right motion"—the predefined object 24 may move from right to left, from a location which is beyond a right edge of a control boundary, over the right edge, to a location which is to the left of the right edge.

"Hand-left motion"—the predefined object 24 may move from left to right, from a location which is beyond a left edge of a control boundary, over the left edge, to a location which is to the right of the left edge.

"Hand-up motion"—the predefined object 24 may move upwards from a location which is below a bottom edge of a control boundary, over the bottom edge, to a location which is above the bottom edge.

"Hand-down motion"—the predefined object 24 may move downwards from a location which is above a top edge of a control boundary, over the top edge, to a location which is below the top edge.

"Hand-corner up-right"—the predefined object 24 may begin at a location beyond the upper-right corner of the control boundary and move over the upper-right corner to the other side of the control boundary.

"Hand-corner up-left"—the predefined object 24 may begin at a location beyond the upper-left corner of the control boundary and move over the upper-left corner to the other side of the control boundary.

"Hand-corner down-right"—the predefined object 24 may begin at a location beyond the lower-right corner of the control boundary and move over the lower-right corner to the other side of the control boundary.

"Hand-corner down-left"—the predefined object 24 may begin at a location beyond the lower-left corner of the control boundary and move over the lower-left corner to the other side of the control boundary.

Figure 5A:
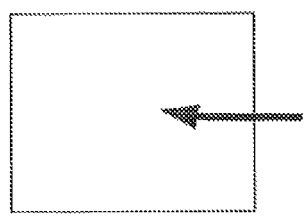
FIGS. 5A-5L illustrate graphical representations of example motion paths that may be associated with touch-free gesture systems and methods consistent with the disclosed embodiments.
Figure 5B:
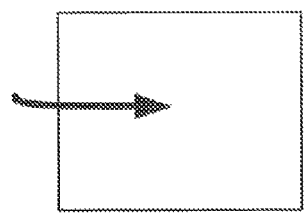
Figure 5C:
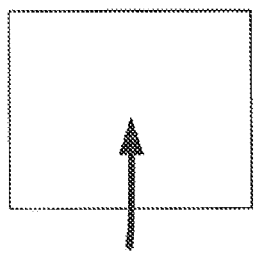
Figure 5D:
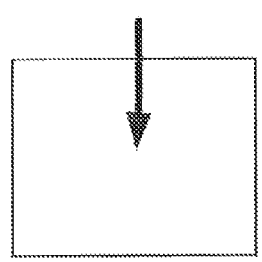
Figure 5E:
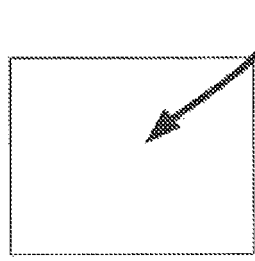
Figure 5F:
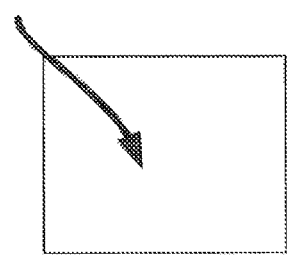
Figure 5G:
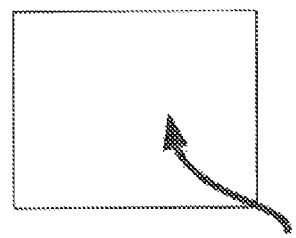
Figure 5H:
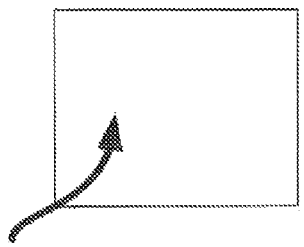
Figure 5I:
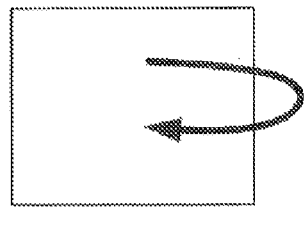
Figure 5J:
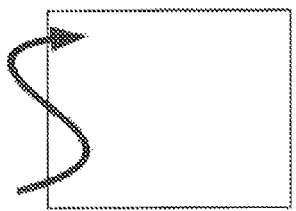
Figure 5K:
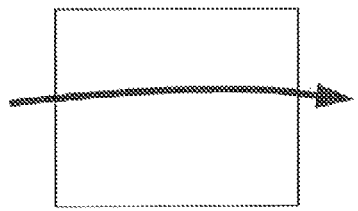
Figure 5L:
Figure 6:
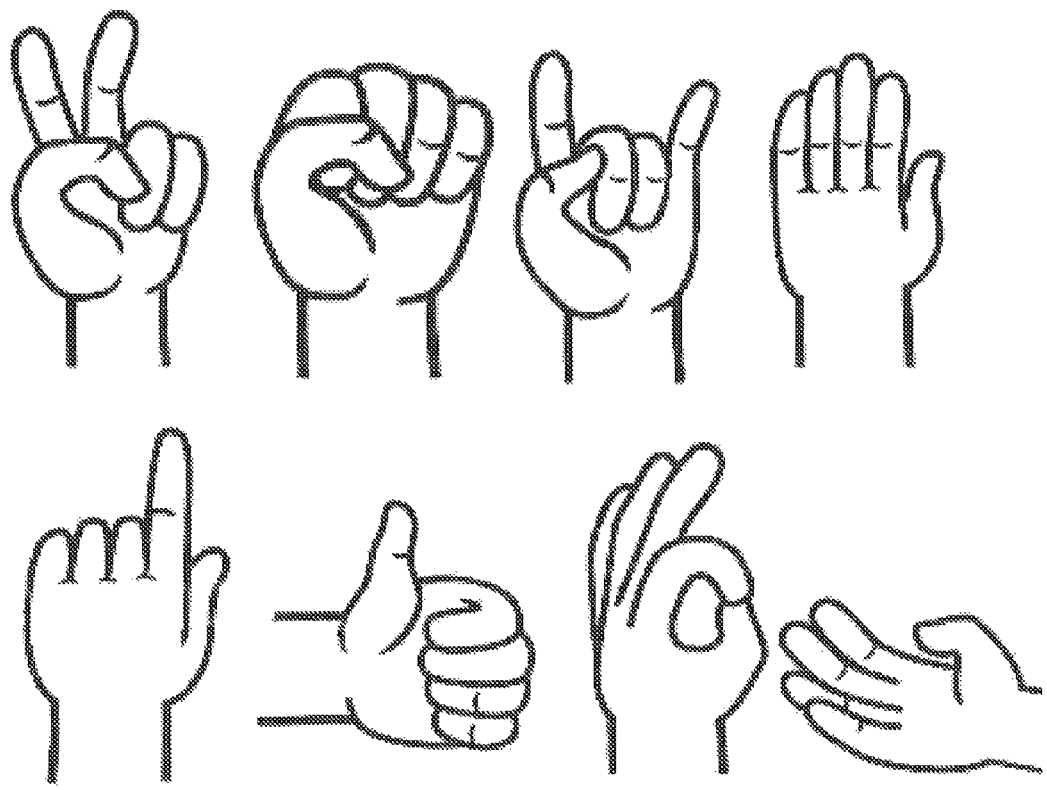
FIG. 6 illustrates a few exemplary hand poses that may be associated with touch-free gesture systems and methods consistent with the disclosed embodiments.

FIGS. 5A-5L depict graphical representations of a few exemplary motion paths (e.g., the illustrated arrows) of gestures, and the gestures' relationship to a control boundary (e.g., the illustrated rectangles), FIG. 6 depicts a few exemplary representations of hand poses that may be used during a gesture, and may affect a type of gesture that is detected and/or action that is caused by a processor. Each differing combination of motion path and gesture may result in a differing action.

In some embodiments, the at least one processor is also configured to access information associated with at least one control boundary, the control boundary relating to a physical dimension of a device in a field of view of the user, or a physical dimension of a body of the user as perceived by the image sensor (operation 240). In some embodiments the processor 12 is configured to generate the information associated with the control boundary prior to accessing the information. However, the information may also, for example, be generated by another device, stored in memory 16, and accessed by processor 12. Accessing information associated with at least one control boundary may include any operation performed by processor 12 in which the information associated with the least one control boundary is acquired by processor 12. For example, the information associated with at least one control boundary may be received by processor 12 from memory 16, may be received by processor 12 from an external device, or may be determined by processor 12.

A control boundary may be determined (e.g., by processor 12 or by another device) in a number of different ways. As discussed above, a control boundary may relate to one or more of a physical dimension of a device, which may, for example, be in a field of view of the user, a physical location of the device, the physical location of the device in relation to the location of the user, physical dimensions of a body as perceived by the image sensor, or a physical location of a user's body or body parts as perceived by the image sensor. A control boundary may be determined from a combination of information related to physical devices located in the physical space where the user performs a gesture and information related to the physical dimensions of the user's body in that the physical space. Moreover, a control boundary may relate to part of a physical device, and location of such part. For example, the location of speakers of a device may be used to determine a control boundary (e.g., the edges and corners of a speaker device), so that if a user performs gestures associated with the control boundary (e.g., a downward gesture along or near the right edge of the control boundary, as depicted, for example, in FIG. 5L), the volume of the speakers may be controlled by the gesture. A control boundary may also relate one or more of a specific location on the device, such as the location of the manufacturer logo, or components on the device. Furthermore, the control boundary may also relate to virtual objects as perceived by the user. Virtual objects may be objects displayed to the user in 3D space in the user's field of view by a 3D display device or by a wearable display device, such as wearable augmented reality glasses. Virtual objects, for example, may include icons, images, video, or any kind of visual information that can be perceived by the user in real or virtual 3D. As used in this application, a physical dimension of a device may include a dimension of a virtual object.

Figure 3:
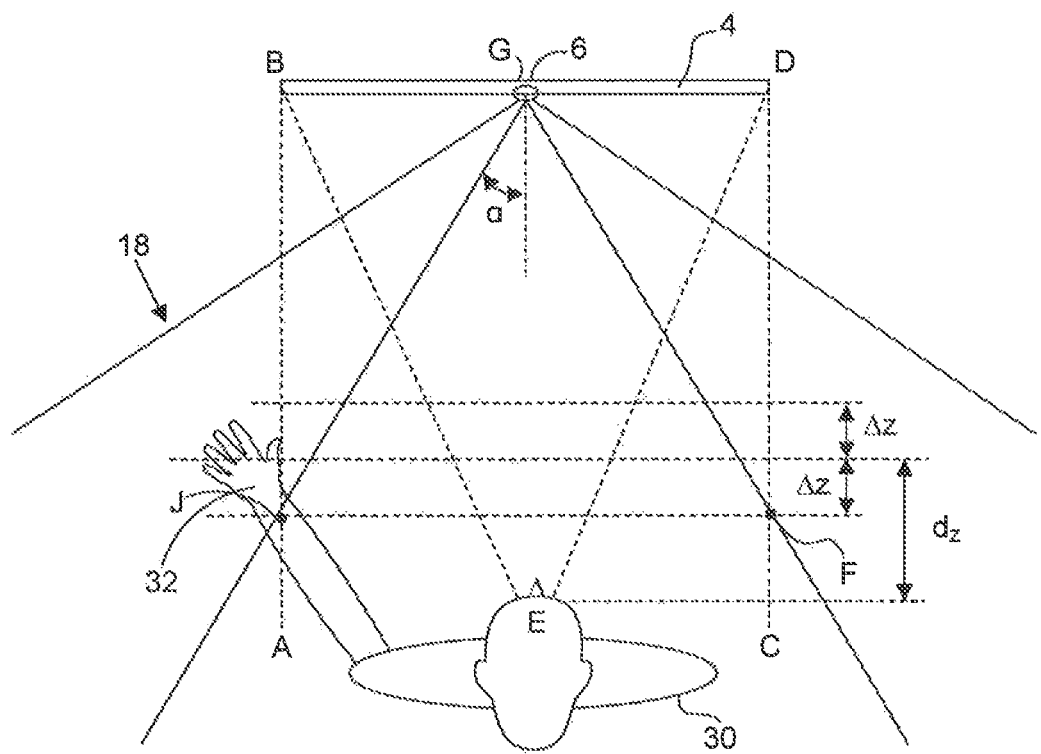
FIG. 3 illustrates an example implementation of a touch-free gesture recognition system in accordance with some of the disclosed embodiments.
Figure 4:
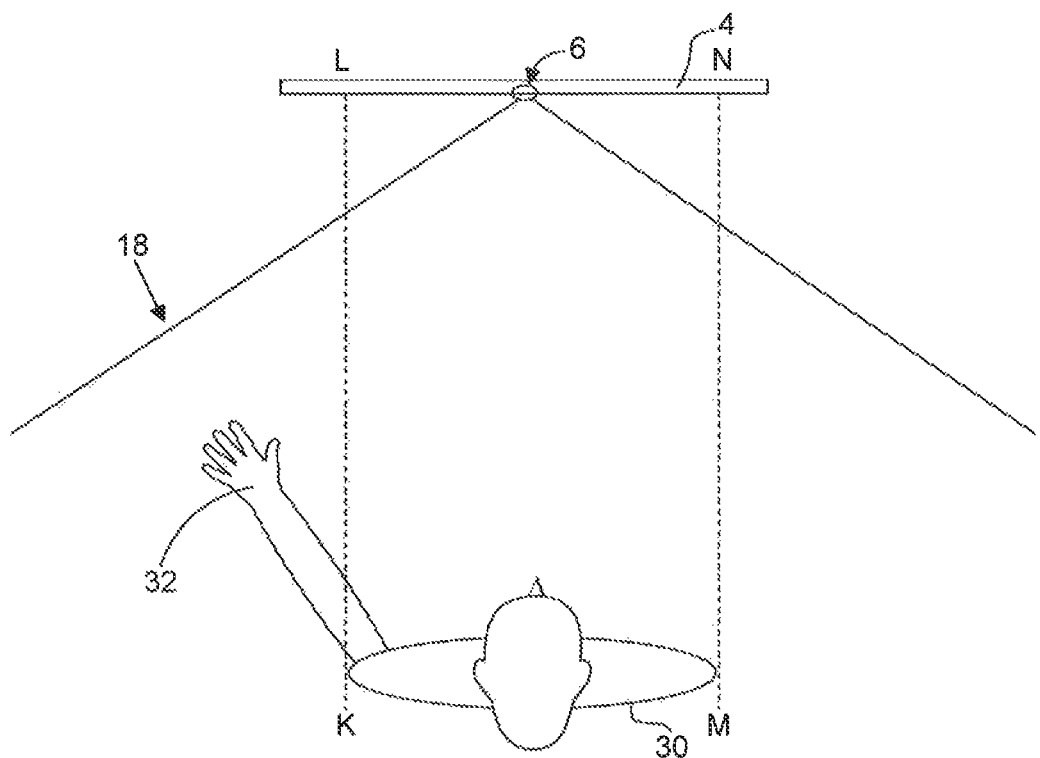
FIG. 4 illustrates another example implementation of a touch-free gesture recognition system in accordance with some of the disclosed embodiments.

FIG. 3 depicts an exemplary implementation of a touch-free gesture recognition system in accordance with some embodiments in which the control boundary may relate to a physical dimension of a device in a field of view of the user. FIG. 4 depicts an exemplary implementation of a touch-free gesture recognition system in accordance with some embodiments in which the control boundary may relate to a physical dimension of a body of the user.

As depicted in the example implementation in FIG. 3, user 30 may view display 4 within the conical or pyramidal volume of space 18 viewable by image sensor 6. In some embodiments, the control boundary relates to broken lines AB and CD, which extend perpendicularly from defined locations on the device, such as, for example, the left and right edges of display 4. For example, as discussed below, the processor 12 may be configured to determine one or more locations in the image information that correspond to lines AB and CD. While only broken lines AB and CD are depicted in FIG. 3, associated with the left and right edges of display 4, in some embodiments the control boundary may additionally or alternatively be associated with the top and bottom edges of display 4, or some other physical dimension of the display, such as a border, bevel, or frame of the display, or a reference presented on the display. Moreover, while the control boundary may be determined based on the physical dimensions or other aspects of display 4, the control boundary may also be determined based on the physical dimensions of any other device (e.g., the boundaries or contour of a stationary object).

The processor 12 may be configured to determine the location and distance of the user from the display 4. For example, the processor 12 may use information from a proximity sensor, a depth sensing sensor, information representative of a 3D map in front of the device, or use face detection to determine the location and distance of the user from the display 4, and from the location and distance compute a field of view (FOV) of the user. For example, an inter-pupillary distance in the image information may be measured and used to determine the location and distance of the user from the display 4. For example, the processor may be configured to compare the inter-pupillary distance in the image information to a known or determined inter-pupillary distance associated with the user, and determine a distance based on the difference (as the user stands further from image sensor 6, the inter-pupillary distance in the image information may decrease). The accuracy of the user distance determination may be improved by utilizing the user's age, since, for example, a younger user may have a smaller inter-pupillary distance. Face recognition may also be applied to identify the user and retrieve information related to the identified user. For example, an Internet social medium (e.g., Facebook) may be accessed to obtain information about the user (e.g., age, pictures, interests, etc.), This information may be used to improve the accuracy of the inter-pupillary distance, and thus improve the accuracy of the distance calculation of the user from the screen.

The processor 12 may also be configured to determine an average distance dz in front of the user's eyes that the user positions the predefined object 24 when performing a gesture.

The average distance dz may depend on the physical dimensions of the user (e.g., the length of the user's forearm), which can be estimated, for example, from the user's inter-pupillary distance. A range of distances dz+$\Delta$z through dz−$\Delta$z) surrounding the average distance dz may also be determined. During the performance of a gesture, the predefined object 24 may often be found at a distance in the interval between dz+$\Delta$z to dz−$\Delta$z. In some embodiments, $\Delta$z may be predefined. Alternatively, $\Delta$z may be calculated as a fixed fraction (e.g., 0.2) of dz. As depicted in FIG. 3, broken line FJ substantially parallel to the display 4 at a distance dz−$\Delta$z from the user may intersect, the broken lines AB and CD at points F and J. Points F and J may be representative of a region of the viewing space of the image sensor 6 having semi-apical angle $\alpha$, indicated by the broken lines GJ and GF, which serve to determine the control boundary. Thus, for example, if the user's hand 32 is outside of the region bounded by the lines GJ and GF, the hand 32 may be considered to be outside the control boundary. Thus, in some embodiments, the information associated with the control boundary may be, for example, the locations of lines GJ and GF in the image information, or information from which the locations of lines GJ and GF in the image information can be determined.

Alternatively or additionally, in some embodiments, at least one processor is configured to determine the control boundary based, at least in part, on a dimension of the device (e.g., display 4) as is expected to be perceived by the user. For example, broken lines BE and BD in FIG. 3, which extend from a location on or near the body of the user (determined, for example, based on the distance from the image sensor 6 to the user, the location of the user's face or eyes, and/or the FOV of the user) to the left and right edges of display 4, are representative of dimensions of display 4 as is expected to be perceived by the user. That is, based on the distance and orientation of the user relative to the display 4, the processor may be configured to determine how the display is likely perceived from the vantage point of the user. (E.g., by determining sight lines from the user to the edges of the display.) Thus, the processor may be configured to determine the control boundary by determining one or more locations in the image information that correspond to lines BE and BD (e.g., based on an analysis of the average distance from the user's body that the user positions the predefined object 24). While only broken lines BE and BD are depicted in FIG. 3, associated with the left and right edges of display 4, in some embodiments the control boundary may additionally or alternatively be associated with the top and bottom edges of display 4.

Alternatively or additionally, the control boundary may relate to a physical dimension of a body of the user as perceived by the image sensor. That is, based on the distance and/or orientation of the user relative to the display or image sensor, the processor may be configured to determine a control boundary. The farther the user from the display, the smaller the image sensor's perception of the user, and the smaller an area hounded by the control boundaries. The processor may be configured to identify specific portions of a user's body for purposes of control boundary determination. Thus the control boundary may relate to the physical dimensions of the user's torso, shoulders, head, hand, or any other portion or portions of the user's body. The control boundary may be related to the physical dimension of a body portion by either relying on the actual or approximate dimension of the body portion, or by otherwise using the body portion as a reference for setting control boundaries. (E.g., a control boundary may be set a predetermined distance from a reference location on the body portion.)

The processor 12 may be configured to determine a contour of a portion of a body of the user (e.g., a torso of the user) in the image information received from image sensor 6. Moreover, the processor 12 may be configured to determine, for example, an area bounding the user (e.g., a bounding box surrounding the entire user or the torso of the user). For example, the broken lines KL and MN depicted in FIG. 4 are associated with the left and right sides of a contour or area bounding the user. The processor 12 may be configured to determine the control boundary by determining one or more locations in the image information that correspond to the determined contour or bounding area. Thus, for example, the processor 12 may be configured to determine the control boundary by detecting a portion of a body of the user, other than the user's hand (e.g., a torso), and to define the control boundary based on the detected body portion. While only broken lines associated with the left and right sides of the user are depicted in FIG. 4, in some embodiments the control boundary may additionally or alternatively be associated with the top and bottom of the contour or bounding area.

In some embodiments, the at least on processor may be configured to cause a visual or audio indication when the control boundary is crossed. For example, if an object in the image information associated with predefined object 24 crosses the control boundary, this indication may inform the user that a gesture performed within a predefined amount of time will be interpreted as gesture associated with the control boundary. For example, if an edge of the control boundary is crossed, an icon may begin to fade-in on display 4. If the gesture is completed within the predefined amount of time, the icon may be finalized; if the gesture is not completed within the predefined amount of time, the icon may no longer be presented on display 4.

While a control boundary is discussed above with respect to a single user, the same control boundary may be associated with a plurality of users. For example, when a gesture performed by one user is detected, a control boundary may be accessed that was determined for another user, or that was determined for a plurality of users. Moreover, the control boundary may be determined based on an estimated location of a user, without actually determining the location of the user.

In some embodiments, the at least one processor is also configured to cause an action associated with the detected gesture, the detected gesture location, and a relationship between the detected gesture location and the control boundary (operation 250). As discussed above, an action caused by a processor may be, for example, generation of a message or execution of a command associated with the gesture. A message or command may be, for example, addressed to one or more operating systems, one or more services, one or more applications, one or more devices, one or more remote applications, one or more remote services, or one or more remote devices. In some embodiments, the action includes an output to a user. For example, the action may provide an indication to a user that some event has occurred. The indication may be, for example, visual (e.g., using display 4), audio, tactile, ultrasonic, or haptic. An indication may be, for example, an icon presented on a display, change of an icon presented on a display, a change in color of an icon presented on a display, an indication light, an indicator moving on a display, a directional vibration indication, or an air tactile indication. Moreover, for example, the indicator may appear on top of all other images appearing on the display.

In some embodiments, memory 16 stores data (e.g., a lookup table) that provides, for one or more predefined gestures and/or gesture locations, one or more corresponding actions to be performed by the processor 12. Each gesture that is associated with a control boundary may be characterized by one or more of the following factors: the starting point of the gesture, the motion path of the gesture (e.g., a semicircular movement, a back and forth movement, an "S"-like path, or a triangular movement), the specific edges or corners of the control boundary crossed by the path, the number of times an edge or corner of the control boundary is crossed by the path, and where the path crosses edges or corners of the control boundary. By way of example only, a gesture associated with a right edge of a control boundary may toggle a charm menu, a gesture associated with a top edge of a control boundary or bottom edge of a control boundary may toggle an application command, a gesture associated with a left edge of a control boundary may switch to a last application, and a gesture associated with both a right edge and a left edge of a control boundary (e.g., as depicted in FIG. 5K) may select an application or start menu. As an additional example, if a gesture crosses a right edge of a control boundary, an image of a virtual page may progressively cross leftward over the right edge of the display so that the virtual page is progressively displayed on the display; the more the predefined object associated with the user is moved away from the right edge of the screen, the more the virtual page is displayed on the screen.

For example, processor 12 may be configured to cause a first action when the gesture is detected crossing the control boundary, and to cause a second action when the gesture is detected within the control boundary. That is, the same gesture may result in a different action based on whether the gesture crosses the control boundary. For example, a user may perform a right-to-left gesture. If the right-to-left gesture is detected entirely within the control boundary, the processor may be configured, for example, to shift a portion of the image presented on display 4 to the left (e.g., a user may use the right-to-left gesture to move a photograph presented on display 4 in a leftward direction). If, however, the right-to-left gesture is detected to cross the right edge of the control boundary, the processor may be configured, by way of example only, to replace the image presented on display 4 with another image (e.g., a user may use the right-to-left gesture to scroll through photographs in a photo album).

Moreover, for example, the processor 12 may be configured to distinguish between a plurality of predefined gestures to cause a plurality of actions, each associated with a differing predefined gesture. For example, if differing hand poses cross the control boundary at the same location, the processor may cause differing actions. For example, a pointing finger crossing the control boundary may cause a first action, while an open hand crossing the control boundary may cause a differing second action. As an alternative example, if a user performs a right-to-left gesture that is detected to cross the right edge of the control boundary, the processor may cause a first action, but crossing the control boundary in the same location with the same hand pose, but from a different direction, may cause a second action. As another example, a gesture performed in a first speed may cause a first action; the same gesture, when performed in second speed, may cause a second action. As another example, a left-to-right gesture performed in a first motion path representative of the predefined object (e.g., the user's hand) moving a first distance (e.g. 10 cm) may cause a first action; the same gesture performed in a second motion path representative of the predefined object moving a second distance (e.g. 30 cm) may cause a second action The first and second actions could be any message or command. By way of example only, the first action may replace the image presented on display 4 with a previously viewed image, while the second action may cause a new image to be displayed.

Moreover, for example, the processor 12 may be configured to generate a plurality of actions, each associated with a differing relative position of the gesture location to the control boundary. For example, if a first gesture (e.g. left to right gesture) crosses a control boundary near the control boundary top, the processor may be configured to generate a first action, while if the same first gesture, crosses the control boundary near the control boundary bottom, the processor may be configured to generate a second action. Another example, if a gesture that crosses the control boundary begins at a location outside of the control boundary by more than a predetermined distance, the processor may be configured to generate a first action. However, if a gesture that crosses the control boundary begins at a location outside of the control boundary by less than a predetermined distance, the processor may be configured to generate a second action. By way of example only, the first action may cause an application to shut down while the second action may close a window of the application.

Moreover, for example, the action may be associated with a predefined motion path associated with the gesture location and the control boundary. For example, memory 16 may store a plurality of differing motion paths, with each detected path causing a differing action. A predefined motion path may include a set of directions of a gesture (e.g., left, right, up down, left-up, left-down, right-up, or right-down) in a chronological sequence. Or, a predefined motion path may be one that crosses multiple boundaries (e.g., slicing a corner or slicing across entire display), or one that crosses a boundary in a specific region (e.g., crosses top right).

A predefined motion path may also include motions associated with a boundary, but which do not necessarily cross a boundary. (E.g., up down motion outside right boundary; up down motion within right boundary).

Moreover, a predefined motion path may be defined by a series of motions that change direction in a specific chronological sequence. (E.g., a first action may be caused by down-up, left right; while a second action may be caused by up-down, left-right).

Moreover, a predefined motion path may be defined by one or more of the starting point of the gesture, the motion path of the gesture (e.g., a semicircular movement, a back and forth movement, an "S"-like path, or a triangular movement), the specific edges or corners of the control boundary crossed by the path, the number of times an edge or corner of the control boundary is crossed by the path, and where the path crosses edges or corners of the control boundary.

In some embodiments, as discussed above, the processor may be configured to determine the control boundary by detecting a portion of a body of the user, other than the user's hand (e.g., a torso), and to define the control boundary based on the detected body portion. In some embodiments, the processor may further be configured to generate the action based, at least in part, on an identity of the gesture, and a relative location of the gesture to the control boundary. Each different predefined gesture (e.g., hand pose) may have a differing identity. Moreover, a gesture may be performed at different relative locations to the control boundary, enabling each different combination of gesture/movement relative to the control boundary to cause a differing action.

In addition, the processor 12 may be configured to perform different actions based on the number of times a control boundary is crossed or a length of the path of the gesture relative to the physical dimensions of the user's body. For example, an action may be caused by the processor based on a number of times that each edge or corner of the control boundary is crossed by a path of a gesture. By way of another example, a first action may be caused by the processor if a gesture, having a first length, is performed by a first user of a first height. The first action may also be caused by the processor if a gesture, having a second length, is performed by a second user of a second height, if the second length as compared to the second height is substantially the same as the first length as compared to the first height. In this example scenario, the processor may cause a second action if a gesture, having the second length, is performed by the first user.

The processor 12 may be configured to cause a variety of actions for gestures associated with a control boundary. For example, in addition to the examples discussed above, the processor 12 may be configured to activate a toolbar presented on display 4, which is associated with a particular edge of the control boundary, based on the gesture location. That is, for example, if it is determined that the gesture crosses a right edge of the control boundary, a toolbar may be displayed along the right edge of display 4. Additionally, for example, the processor 12 may be configured to cause an image to be presented on display 4 based on the gesture, the gesture location, and the control boundary (e.g., an edge crossed by the gesture).

By configuring a processor to cause an action associated with a detected gesture, the detected gesture location, and a relationship between the detected gesture location and a control boundary, a more robust number of types of touch-free gestures by a user can be performed and detected. Moreover, touch-free gestures associated with a control boundary may increase the usability of a device that permits touch-free gestures to input data or control operation of the device.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A touch-free gesture recognition system, comprising:
at least one processor configured to:
receive image information from an image sensor;
determine one or more locations in the image information relating to at least one control boundary based, at least in part, on a physical dimension of a device in a field of view of a user;
detect in the image information a gesture performed by the user;
detect a gesture location in the image information, wherein at least a portion of the gesture location is detected outside the control boundary, and wherein the gesture location is associated with at least one control boundary crossed by the detected gesture; and
cause an action associated with the detected gesture, the detected gesture location, and a relationship between the detected gesture location and the control boundary.

2. The system of claim 1, wherein the processor is further configured to determine the control boundary based, at least in part, on a dimension of the device as is expected to be perceived by the user.

3. The system of claim 1, wherein the control boundary is determined based, at least in part, on at least one of an edge or corner of the device as is expected to be perceived by the user.

4. The system of claim 1, wherein the processor is further configured to distinguish between a plurality of predefined gestures to cause a plurality of actions, each associated with a differing predefined gesture.

5. The system of claim 1, wherein the processor is further configured to generate a plurality of actions, each associated with a differing relative position of the gesture location to the control boundary.

6. The system of claim 1, wherein the processor is further configured to determine the control boundary by detecting a portion of a body of the user, other than the user's hand, and to define the control boundary based on the detected body portion, and wherein the processor is further configured to generate the action based, at least in part, on an identity of the gesture, and a relative location of the gesture to the control boundary.

7. The system of claim 1, wherein the processor is further configured to determine the control boundary based on a contour of at least a portion of a body of the user in the image information.

8. The system of claim 1, wherein the device includes a display, and wherein the processor is further configured to determine the control boundary based on dimensions of the display.

9. The system of claim 8, wherein processor is further configured to determine the control boundary based on at least one of an edge or corner of a display associated with the device.

10. The system of claim 8, wherein the processor is further configured to activate a toolbar associated with a particular edge based, at least in part, on the gesture location.

11. The system of claim 1, wherein the action is related to a number of times at least one of an edge or corner of the control boundary is crossed by a path of the gesture.

12. The system of claim 1, wherein the action is associated with a predefined motion path associated with the gesture location and the control boundary.

13. The system of claim 1, wherein the action is associated with a predefined motion path associated with particular edges or corners crossed by the gesture location.

14. The system of claim 1, wherein the processor is further configured to detect a hand in a predefined location relating to the control boundary and initiate detection of the gesture based on the detection of the hand at the predefined location.

15. The system of claim 1, wherein the processor is further configured to cause at least one of a visual or audio indication when the control boundary is crossed.

16. The system of claim 1, wherein the control boundary is determined, at least in part, based on a distance between the user and the image sensor.

17. The system of claim 1, wherein the control boundary is determined, at least in part, based on a location of the user in relation to the device.

18. The system of claim 1, wherein prior to the gesture detection, the at least one processor is configured to provide an indication that a gesture associated with the at least one control boundary is enabled.

19. The system of claim 1, wherein the processor is further configured to distinguish between a plurality of predefined motion paths associated with the same gesture to cause a plurality of actions, each action associated with a different motion path.

20. The system of claim 1, wherein the detected gesture comprises an identified predefined hand pose and an identified predefined motion path.

21. A method for a touch-free gesture recognition system, comprising:
   receiving image information from an image sensor;
   determining one or more locations in the image information relating to at least one control boundary based, at least in part, on a physical dimension of a device in a field of view of a user;
   detecting in the image information a gesture performed by the user;
   detecting a gesture location in the image information, wherein at least a portion of the gesture location is detected outside the control boundary, and wherein the gesture location is associated with at least one control boundary crossed by the detected gesture; and
   causing an action associated with the detected gesture, the detected gesture location, and a relationship between the detected gesture location and the control boundary.

22. The method of claim 21, wherein the physical dimension of the device in the field of view of the user is a dimension as is expected to be perceived by the user.

23. The method of claim 21, wherein the control boundary is determined based, at least in part, on at least one of an edge or corner of the device as is expected to be perceived by the user.

24. The method of claim 21, further comprising generating a plurality of actions, each associated with a differing relative position of the gesture location to the control boundary.

25. The method of claim 21, further comprising determining the control boundary by detecting a portion of a body of the user, other than the user's hand, and defining the control boundary based on the detected body portion, and generating the action based, at least in part, on an identity of the gesture, and a relative location of the gesture to the control boundary.

26. The method of claim 21, further comprising determining the control boundary based on dimensions of the display.

27. The method of claim 26, further comprising activating a toolbar associated with a particular edge based, at least in part, on the gesture location.

28. The method of claim 21, wherein the control boundary is determined based on at least one of an edge or a corner of the device.

29. The method of claim 21, wherein the action is associated with a predefined motion path associated with the gesture location and the control boundary.

30. The method of claim 21, wherein the action is associated with a predefined motion path associated with particular edges or corners crossed by the gesture location.

31. The method of claim 21, further comprising detecting a hand in predefined location relating to the control boundary and initiating detection of the gesture based on the detection of the hand at the predefined location.

32. The method of claim 21, wherein the control boundary is determined, at least in part, based on a distance between the user and the image sensor.

33. The method of claim 21, further comprising providing, prior to the gesture detection, an indication that a gesture associated with the at least one control boundary is enabled.

34. The method of claim 21, further comprising distinguishing between a plurality of predefined motion paths associated with the same gesture to cause a plurality of actions, each action associated with a different motion path.

35. The method of claim 21, wherein detecting the gesture comprises identifying a predefined hand pose and a predefined motion path.

36. A touch-free gesture recognition system, comprising:
   at least one processor configured to:
      receive image information from an image sensor;
      determine at least one location in the image information associated with a control boundary based, at least in part, on a physical dimension of a device in a field of view of a user;
      detect in the image information a gesture performed by the user, wherein at least a portion of the gesture is detected outside the control boundary;
      determine whether the detected gesture crosses the at least one location associated with the control boundary;
      cause a first action when the detected gesture crosses the at least one location associated with the control boundary; and
      cause a second action when the detected gesture does not cross the at least one location associated with the control boundary.

37. The system of claim 36, wherein the detected gesture comprises an identified predefined hand pose and an identified predefined motion path.

\* \* \* \* \*